United States Patent [19]

Thise-Fourgon

[11] Patent Number: 4,506,717

[45] Date of Patent: Mar. 26, 1985

[54] WOVEN WIRE FABRIC AND A TIRE HAVING A TREAD REINFORCING PLY MADE THEREOF

[75] Inventor: Marie-Rita Thise-Fourgon, Bras, Belgium

[73] Assignee: The Goodyear Tire & Rubber Company, Akron, Ohio

[21] Appl. No.: 479,763

[22] Filed: Mar. 28, 1983

[51] Int. Cl.³ .............................................. B60C 9/20
[52] U.S. Cl. .................................... 152/358; 152/359; 152/361 R; 152/361 DM; 428/259; 428/261; 428/268; 428/273; 139/420 C; 139/425 R
[58] Field of Search ................... 152/358, 359, 361 R, 152/361 DM, 357 R, 361 FP; 428/259, 261, 268, 273, 295, 394; 139/420 C, 425 R

[56] References Cited

U.S. PATENT DOCUMENTS

| | | | |
|---|---|---|---|
| 2,812,409 | 11/1957 | Jones et al. | 139/425 R |
| 2,836,529 | 5/1958 | Morris | 428/259 |
| 3,586,063 | 6/1971 | Bell, Jr. | 139/425 R |
| 3,707,120 | 12/1972 | Schroeder | 152/358 |
| 3,787,224 | 1/1974 | Uffner | 139/420 C |
| 3,949,129 | 4/1976 | Hubbard | 428/190 |
| 3,950,868 | 4/1976 | Holroyd et al. | 139/420 C |
| 3,991,803 | 11/1976 | Praszek | 152/361 R |
| 4,073,330 | 2/1978 | Allard | 152/355 |
| 4,282,011 | 8/1981 | Terpay | 139/420 C |

Primary Examiner—Lois E. Boland
Attorney, Agent, or Firm—L. R. Drayer

[57] ABSTRACT

A woven fabric is generally comprised of metallic warp cords and non-metallic weft cords. The weft cords are comprised of a plurality of glass filaments encapsulated in a resorcinol-formaldehyde-latex adhesive.

8 Claims, 4 Drawing Figures

WOVEN WIRE FABRIC AND A TIRE HAVING A TREAD REINFORCING PLY MADE THEREOF

BACKGROUND OF THE INVENTION

The present invention relates generally to woven fabric having metallic warp cords and non-metallic weft cords, and more specifically to woven wire fabric having weft cords comprised of a plurality of glass filaments encapsulated in a resorcinol-formaldehyde-latex adhesive.

Tire-reinforcement components are generally comprised of reinforcing elements, hereinafter referred to as warp cords, embedded in an elastomeric substance, such as natural or synthetic rubber. The use of metallic warp cords, comprised of metallic wires or cables, as reinforcing elements in tire reinforcement components, such as tread-reinforcing plies, is well known in the tire manufacturing technology. The warp cords may be embedded in the elastomeric substance by means of a calendering process. The calendering process for metallic warp cords may consist of arranging the desired number of metallic warp cords, that are pulled from a creel, into a predetermined orientation and then compressing an elastomeric substance around and between the adjacent warp cords to form a continuous sheet. This process is generally referred to in the tire manufacturing technology as "creel calendering". However, if the metallic warp cords have been interwoven with weft cords, the woven wire fabric is merely pulled from a roll of fabric that has been placed on a let-off device, through a calender which compresses an elastomeric substance around and between the adjacent warp cords and weft cords, and wound up onto a core on a take-up device. The sheet of "creel-calendered" or "woven wire" fabric is then cut to predetermined dimensions to form reinforcing components for tires or similar articles.

For purposes of describing and claiming the present invention, "warp cords" shall mean cords, wires, or cables, that are substantially parallel to, and equidistant from adjacent cords, wires, or cables, and that are intended to act as reinforcing elements when incorporated into a tire or similar article. In addition to warp cords, woven fabrics also have weft cords, sometimes referred to as "pick cords" or "fill cords". For purposes of describing and claiming the present invention, "weft cords" shall mean cords that are oriented substantially transverse to warp cords to hold the warp cords in a predetermined relationship to each other, parallel to and equidistant from adjacent warp cords, while not being intended to act as reinforcing elements in a tire or similar article. For purposes of describing and claiming the present invention, "woven wire fabric" shall mean a fabric comprised of metallic warp cords and non-metallic weft cords, formed by weaving. "Weaving" as used herein and in the appended claims means the interlacing of warp cords and weft filaments.

The use of woven wire fabric in the reinforcing components of tires is desirable because the spatial relationships of the warp cords of creel-calendered fabric are more susceptible to distortion during the manufacturing of a tire than those of woven wire fabric. However, the woven wire fabric that has been available up until now has not been without problems. The woven wire fabric that has been used in the past had weft cords of nylon or polyester which did not adhere as well as is desired to the elastomeric substance in which the woven wire fabric is embedded during the calendering process. The poor elastomer to weft cord adhesion in woven wire fabrics having nylon or polyester weft cords may result in the propagation of moisture along the cord and lead to widely spread corrosion of the metallic warp cords. The weft cords of a woven wire fabric made in accordance with the invention have very good adhesion characteristics with the type of elastomeric substances used in the manufacturing of tire-reinforcement components. A tire having tread-reinforcing plies of woven wire fabric according to the invention did not exhibit wide-spread corrosion of the metallic warp cords as a result of the propogation of moisture along the weft cords after a salt corrosion test. A salt corrosion test comprises making four cuts in the tread of a tire at its centerline, all the way down to the tread-reinforcing ply; then running the tire 3,000 kilometers. Every 10 kilometers the tire is run through a bath containing an aqueous NaCl salt solution. After the road use is completed the tread was removed from the tire, and the tread-reinforcing ply was inspected.

There is provided in accordance with one aspect of the invention a woven wire fabric comprising a plurality of metallic warp cords, each of said metallic warp cords being oriented substantially parallel to, and equidistant from, adjacent metallic warp cords; and a plurality of weft cords, said weft cords being interwoven with, and oriented substantially transverse to said metallic warp cords, each of said weft cords comprising a plurality of glass filaments encapsulated in a resorcinol-formaldehyde-latex adhesive.

There is provided in accordance with another aspect of the invention a tire having at least one tread-reinforcing ply comprising woven wire fabric which is comprised of: a plurality of metallic warp cords, each of said metallic warp cords being oriented substantially parallel to, and equidistant from, adjacent metallic warp cords; and a plurality of weft cords, said weft cords being interwoven with, and oriented substantially transverse to said metallic warp cords, each of said weft cords comprising a plurality of glass filaments encapsulated in a resorcinol-formaldehyde-latex adhesive.

BRIEF DESCRIPTION OF THE DRAWING

To acquaint persons skilled in the tire and fabric technologies more fully with the present invention, the invention is described with reference to the drawings in which.

DETAILED DESCRIPTION OF THE INVENTION

Figure 1:
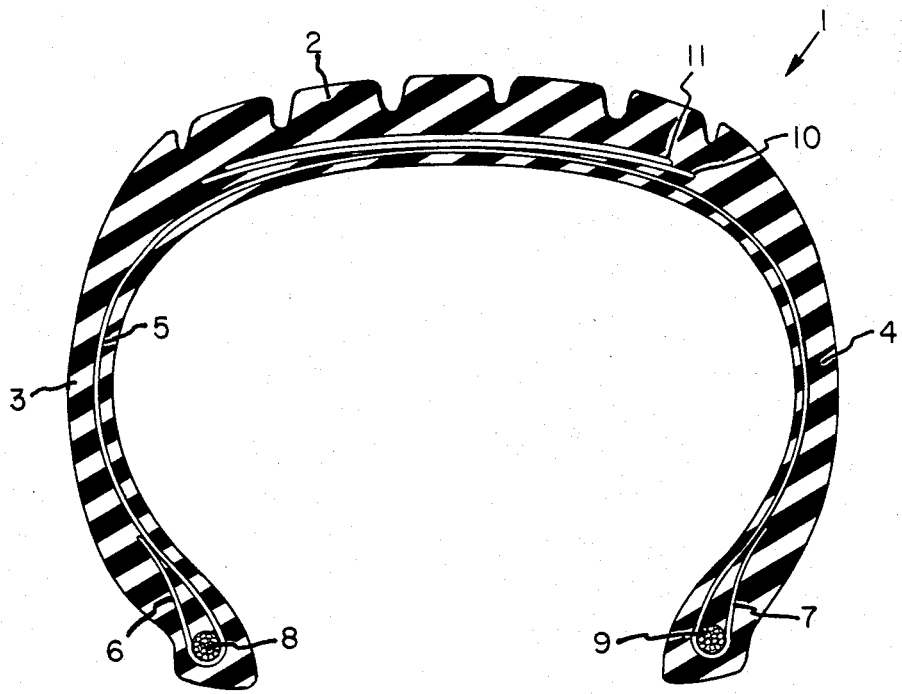
FIG. 1 is a radial cross-sectional view of a radial ply tire.

FIG. 1 shows a radial cross-sectional view of a radial ply tire 1 having a tread-reinforcing ply comprising woven wire fabric made in accordance with the invention. As used herein, a "radial ply tire" is a tire having the reinforcing elements of its carcass reinforcing ply oriented at an angle of between about 90 degrees and about 75 degrees relative to the mid-circumferential plane of the tire. As used herein, the "mid-circumferential" plane is perpendicular to the axis of rotation of a tire and is midway between the sidewalls. It is understood though that woven wire fabric according to the invention may be used in the reinforcing components of a bias ply tire also. The tire 1 shown in FIG. 1 comprises a carcass-reinforcing ply 5, the ends 6,7 of which are anchored around substantially inextensible bead cores 8,9. A tread portion 2 extends circumferentially about the carcass reinforcing ply 5, and a pair of sidewalls 3,4 extend radially inwardly from the axial edges of the tread toward the respective beads. As used herein, "axial" and "axially" refer to the axis of rotation of a tire, and "radial" and "radially" refer to planes in which the axis of rotation lies. The tire 1 further comprises a plurality of tread-reinforcing plies 10,11 circumferentially disposed between the carcass reinforcing ply 5 and the tread portion 2. At least one tread-reinforcing ply of the tire is comprised of woven wire fabric in accordance with the invention. As used herein and in the appended claims, a "tread-reinforcing ply" may be either a belt ply or a breaker ply. It is recognized in the art that the reinforcing elements, or warp cords, of a belt ply are oriented at a lower angle with respect to the mid-circumferential plane of the tire than the reinforcing elements, or warp cords, of the carcass-reinforcing plies; and that the reinforcing elements, or warp cords, of a breaker ply are oriented at the same angle with respect to the mid-circumferential plane of a tire as the reinforcing elements, or warp cords, of the carcass-reinforcing plies.

Figure 2:
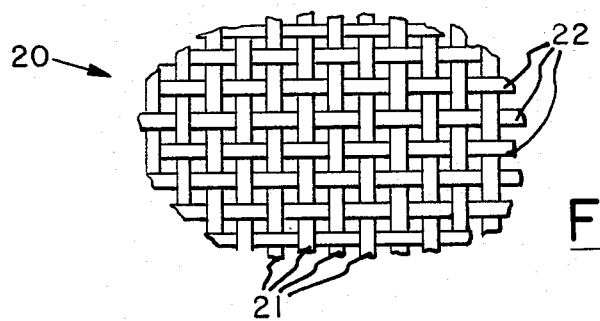
FIG. 2 is a plan view of woven wire fabric made in accordance with the invention.

FIG. 2 is a plan view of a woven wire fabric 20 made in accordance with the present invention. The woven wire fabric 20 comprises a plurality of metallic warp cords 21, which are oriented substantially parallel to and equidistant from adjacent warp cords; and a plurality of weft cords 22 interwoven with, and oriented substantially transverse to the metallic warp cords. Each of the weft cords comprises a plurality of glass filaments encapsulated in a resorcinol-formaldehyde-latex adhesive. The metallic warp cords 21 may be comprised, for example, of steel wire or cables. The weft cords 22 are interwoven transverse to the metallic warp cords 21 to maintain the metallic warp cords in a predetermined orientation, substantially parallel to and equidistant from adjacent warp cords, during the tire manufacturing process. As used herein, the "tire manufacturing process" includes the weaving of the fabric, calendering of the fabric, and cutting of the fabric to form various tire components, as well as the assembly and vulcanization of the tire itself. Methods of weaving metallic warp cords with non-metallic weft cords are already well known to persons skilled in the tire manufacturing and fabric technologies being described, for example, in U.S. Pat. No. 3,828,827, issued to J. L. Witt et al., which is incorporated herein for the purpose of teaching one method of weaving the fabric of the present invention.

Figure 3:
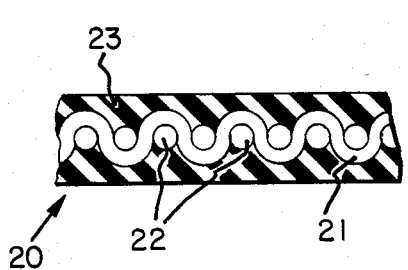
FIG. 3 is a cross-sectional view of the woven wire fabric of FIG. 2, after it has been embedded in a sheet of an elastomeric substance.

FIG. 3 is a cross-sectional view of the woven wire fabric 20 of FIG. 2, after the woven wire fabric has been embedded in an elastomeric substance 23, such as natural or synthetic rubber, by a process such as calendering. The elastomeric substance 23 is interposed between and around the metallic warp cords 21 and the weft cords 22 such that a continuous sheet is produced. A continuous sheet may be cut to form various reinforcing components having predetermined configurations, such as tread-reinforcing plies.

Figure 4:
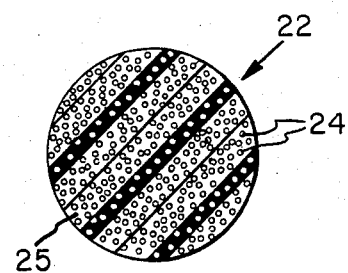
FIG. 4 is a cross-sectional view of a weft cord used in manufacturing woven wire fabric in accordance with the invention.

FIG. 4 is an enlarged cross-sectional view of one of the weft cords 22 of a woven wire fabric according to the invention. Each weft cord 22 comprises a plurality of glass filaments 24 encapsulated in a resorcinol-formaldehyde-latex adhesive 25. Each of the weft cords comprises between about 75 to 85 percent glass filaments, by volume, and between about 15 to 25 percent of the resorcinol-formaldehyde-latex adhesive, by volume. Most preferably, each of the weft cords comprises about 80 percent glass filaments, by volume, and about 20 percent resorcinol-formaldehyde-latex adhesive, by volume.

Resorcinol-formaldahyde-latex adhesives are well known in the tire art. They are the subject of many patents which cover variations in lattices used, modifications of the resin, and additional ingredients for resistance to heat degradation, stronger bond, or other beneficial effects. The process of manufacturing a typical resorcinol-formaldehyde-latex adhesive is generally comprised of an exothermic condensation reaction of resorcinol and formaldehyde in a basic aqueous solution prior to the addition of latex. It is understood for the purposes of describing and claiming the present invention that although it is generally accepted that formaldehyde is the preferred aldehyde, other suitable aldehydes such as acetylaldehyde, furfural, propionaldehyde, and crotonaldehyde, or even materials which under the conditions of reaction liberate formaldehyde, (examples of which are given in U.S. Pat. No. Re. 23,451, column 13, lines 65–73), may be used without deviating from the scope of the invention. The latex is selected for the properties which it imparts to the weft cord, and is preferably chosen to be compatible with the elastomer in which the woven wire fabric will eventually be embedded. The ratio of the ingredients can vary appreciably, depending upon such factors as the latex used, without deviating from the scope of the invention. These ratios have already been investigated extensively, and examples may be found in prior art patents such as, U.S. Pat. No. 2,128,635 (Examples I–IV); U.S. Pat. No. Re. 23,451 (Examples I–X, Examples XII–XVI, and column 4, lines 20–25); and U.S. Pat. No. 3,268,467 (Example 4).

The glass filaments may be manufactured, for example, by the "continuous filament process" that is well known in the art. Glass marbles are melted in an electric furnace and the liquid flows in very fine streams through small orifices in a platinum bushing at the bottom of the melting chamber. The resultant filaments are caught and drawn by a high speed draw-winding mechanism. The resorcinol-formaldehyde-latex adhesive is applied to the untwisted strand of filaments in a dipping operation, providing a good penetration of the adhesive. As used herein, a "strand" is a structure comprised of a plurality of filaments. The result is a strand of glass filaments totally encapsulated in the resorcinol-formaldehyde-latex impregnant system. It is preferable to use a weft cord comprised of a single strand manufactured by a single bushing operation. This will avoid the problem of inadequate adhesion between two or more separate strands which could eventually lead to the propagation of moisture and corrosion of the metallic warp cords. As a result of the glass filaments being encapsulated in the resorcinol-formaldehyde-latex adhesive, the weft cords used in the woven wire fabric of the invention do not require any other special coating, sometimes referred to as "dip", to enhance the adhesion of the weft cords with an elastomer.

The linear density of each of the glass filaments in the weft cords is preferably in the range of about 30 to about 1000 decitex and each glass filament preferably has a diameter in the range of 8 to 15 microns. Decitex is a unit for expressing linear density, equal to the weight in grams of 10,000 meters of fiber. As used herein, a micron is a linear measurement equal to $1 \times 10^{-6}$ meter. The tensile breaking strength of each of the glass filaments in the weft cord is preferably in the range of about a 2 to about a 75 kilogram-force, and the elongation at break is preferably in the range of about 1 to about 4 percent.

For example, warp cords, which were steel cables having a diameter of 0.74 millimeters have been interwoven with weft cords having a diameter of 0.56 millimeters comprised of about 2,000 glass filaments attenuated from a single platinum bushing and encapsulated in a resorcinol-formaldehyde-latex adhesive.

While the exact configuration of a woven wire fabric according to the invention may be selected by a tire designer in accordance with good engineering practices, the spacing of the warp cords may be, for example, in the range of about 390 to about 1170 cords per meter of fabric width; and the spacing between the fiberglass weft cords may be between about 30 to about 120 weft cords per meter of fabric length.

While certain representative embodiments and details have been shown for the purpose of illustrating the invention, it will be apparent to those skilled in the art that various changes and modifications may be made therein without departing from the spirit or scope of the invention.

What is claimed is:

1. A tire comprising at least one belt ply or breaker ply of woven wire fabric which comprises:
   (a) a plurality of metallic warp cords, each of said metallic warp cords being oriented substantially parallel to, and equidistant from, adjacent metallic warp cords; and
   (b) a plurality of weft cords, said weft cords being interwoven with, and oriented substantially transverse to said metallic warp cords, each of said weft cords comprising a single strand of glass filaments encapsulated in a resorcinol-formaldehyde-latex adhesive.

2. A tire according to claim 1, wherein each of the weft cords of said woven wire fabric comprise 75 to 85 percent glass filaments, by volume, and 15 to 25 percent resorcinol-formaldehyde-latex adhesive, by volume.

3. A tire according to claim 1, wherein each of the weft cords of said woven wire fabric comprise 80 percent glass filaments, by volume, and 20 percent resorcinol-formaldehyde-latex adhesive, by volume.

4. A tire according to any of claims 1, 2 or 3, wherein the linear density of each of said glass filaments is in the range of 30 to 1000 decitex.

5. A tire according to claim 4 wherein each glass filament has a diameter in the range of 8 to 15 microns.

6. A tire according to claim 5 wherein the tensile breaking strength of each of said glass filaments is in the range of a 2 to a 75 kilogram-force.

7. A tire according to claim 6 wherein the elongation at break of each of said glass filaments is in the range of 1 to 4 percent.

8. A tire according to claim 7 wherein said glass filaments are not twisted.

* * * * *